Sept. 21, 1965 J. R. POTTHOFF 3,208,071

RECEIVER DISTRIBUTION SYSTEM

Filed May 22, 1961 2 Sheets-Sheet 1

INVENTOR.
JACK R. POTTHOFF

BY

ATTORNEYS

Sept. 21, 1965 J. R. POTTHOFF 3,208,071

RECEIVER DISTRIBUTION SYSTEM

Filed May 22, 1961 2 Sheets-Sheet 2

INVENTOR.
JACK R. POTTHOFF

BY

ATTORNEYS

United States Patent Office 3,208,071

Patented Sept. 21, 1965

3,208,071

RECEIVER DISTRIBUTION SYSTEM

Jack R. Potthoff, La Mesa, Calif., assignor to the United States of America as represented by the Secretary of the Navy Filed May 22, 1961, Ser. No. 111,875
5 Claims. (Cl. 343—853)
(Granted under Title 35, U.S. Code (1952), sec. 266)

The invention described herein may be manufactured and used by or for the Government of the United States of America for governmental purposes without the payment of any royalties thereon or therefor.

The invention relates to a broadband receiving distribution system. The invention is particularly suited for permitting the simultaneous operation of several communication receivers from one or more broadband antennas.

One common way of feeding a plurality of communication receivers from a single antenna is to connect the receivers in parallel using a resistor between each receiver, except one, and the antenna. This type of arrangement has many disadvantages. The resistors attenuate the incoming signals. The reactance of the receiver with no resistor can possibly cause a low impedance or a short to appear across the distribution line at one or more of the other receivers. The resistors do nothing to improve the selectivity of the receivers and the receivers have low burnout protection to strong locally generated transmissions.

Another type of receiver distribution system employs a series string of low-pass and high-pass filters in addition to isolation resistors. The filters divide the response spectrum of the antenna into a number of bands and one or more receivers is operated from the filters in each band. The filters and resistors provide a high insertion loss. The loss provided by the filters is cumulative. Little receiver burnout protection is afforded to receivers operating in the same filter band as the locally generated transmission.

It is an object of this invention to provide a distribution system that will permit a plurality of communication receivers, tuned anywhere within a broad frequency spectrum, to operate simultaneously from a small number of broadband antennas.

It is an object of this invention to provide a receiver distribution system which obviates remote tuning and switching.

It is another object of this invention to provide a receiver distribution system with low insertion loss, improved receiver burnout protection, and monitoring means.

It is still another object of this invention to provide a distribution system with couplers which absorb and transfer to the associated receiver a large percentage of the available power from the transmission system on the operating channel, and which present a high impedance compared to the characteristic impedance of the transmission system with little power absorption and transfer at all other frequencies within the associated frequency spectrum.

Other objects and advantages of the invention will be apparent from a study of the following specifications in connection with the accompanying drawings, wherein.

Figures 1, 2:
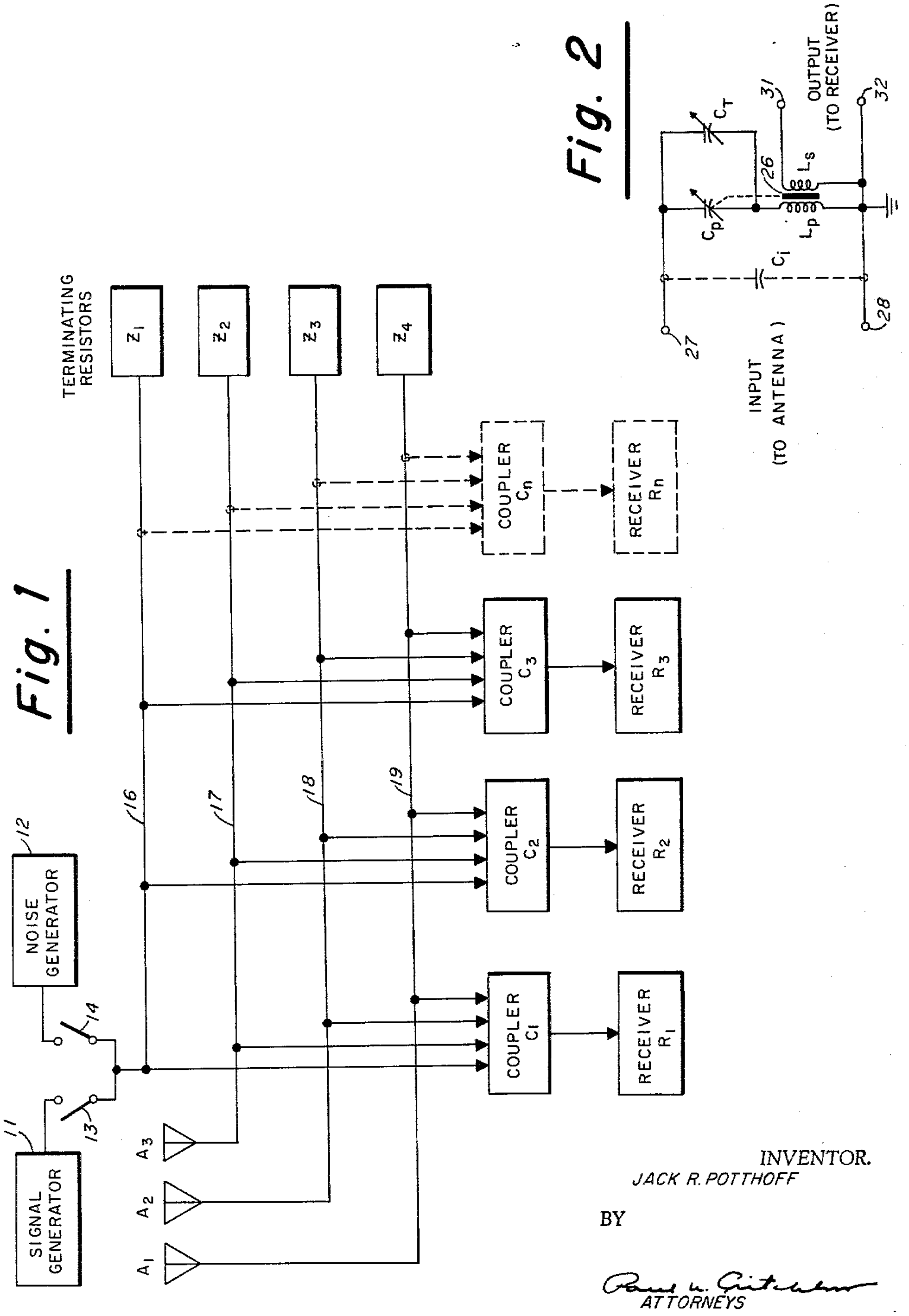
FIG. 1 is a block diagram of the invention.
FIG. 2 is a schematic diagram of the series-tuned circuit employed in the couplers.

FIG. 1 shows the invention in block diagram. Distribution lines 17, 18 and 19 are fed by broadband antennas $A_1$, $A_2$ and $A_3$ and they terminate in terminating resistors $Z_2$, $Z_3$ and $Z_4$, respectively. Antennas $A_1$–$A_3$ are preferably of the type that produce a voltage-standing-wave ratio of 5:1 or better with respect to the characteristic impedance of the associated lead-in line and have an omnidirectional response in the horizontal plane and little or no lobing in the vertical plane. For example, the antennas can be of the vertical type or the discone type.

Antennas $A_1$–$A_3$ cover three adjoining and ascending frequency ranges that can overlap. In the preferred embodiment of the invention the frequency ranges of $A_1$–$A_3$ are 2–6 mc., 5–15 mc. and 11–32 mc., respectively. Terminating resistors $Z_2$–$Z_4$ terminate distribution lines 17–19 in their characteristic impedance to remove any frequency sensitivity and eleminate frequency selective attenuation. Distribution line 16 is also terminated in a terminating resistor $Z_1$ which matches the characteristic impedance of the line. Although any type transmission line can be used for distribution lines 16–19 and the lines to the couplers, co-axial type line is preferred.

Single-pole, single-throw switch 13, when closed, connects distribution line 16 to a signal generator 11 that is capable of generating test signals in the frequency band of the system. Single-pole, single-throw switch 14, when closed, connects distribution line 16 to a noise generator. The two generators enable the tuning units in each coupler and/or the receiver to be pretuned and/or precalibrated under simulated signal and/or noise conditions. This pretuning permits greater accuracy than that obtainable utilizing the antennas when the incoming signals are intermittent or varying.

Couplers $C_1$ through $C_n$ are each coupled, respectively, to distribution lines 16–19. Wide-range communication receivers $R_1$–$R_n$ are connected to couplers $C_1$–$C_n$, respectively. Each coupler contains three tunable circuits, one for each of the three frequency bands. A receiver, such as $R_1$, can be coupled to any one of the antennas $A_1$–$A_3$ by means of the associated tunable circuit in its respective coupler. Couplers $C_1$–$C_n$ are identical. Their circuitry is shown in detail in FIG. 3.

FIG. 2 depicts in schematic-fashion the tunable circuit employed in number in couplers $C_1$–$C_n$. Each coupler contains three of these circuits. In the preferred embodiments, one is tunable over a 2–6 mc. range, one is tunable over a 5–15 mc. range and another is tunable over a 11–32 mc. range. Variable capacitor $C_p$ is connected in shunt with adjustable trimmer capacitor $C_t$. Both capacitors are connected in series with coil $L_p$; and the coil and capacitors are connected between input terminals 27 and 28. Coil $L_s$ is inductively coupled with coil $L_p$ and is connected between output terminals 21 and 22. An adjustable core 26 of powdered iron or ferrite is positioned inside inductively coupled coils $L_p$ and $L_s$. The core 26 is ganged together with the rotor of capacitor $C_p$ so that the rotor and core move simultaneously.

Referring to FIG. 2 and neglecting the effects of $C_i$ stray input capacitance, the magnitude of the input impedance with the output open-circuited and at frequencies that differ from the resonant frequency by amounts that exceed $3/Qo$ of the resonant frequency may be written as $$Z = +jR_pQo[(\gamma^2-1)/\gamma] \qquad (1)$$

where:

$R_p$=input circuit loss resistance
$Qo$=circuit Q at resonance $$\gamma = \frac{\text{actual frequency}}{\text{resonant frequency}}$$

$R_pQ_o$ is made a maximum commensurate with system loss and channel bandwidth requirements. The input impedance can also be written as $$Z=+j\sqrt{L/C}[(\gamma^2-1)/\gamma] \quad (2)$$

where:

$L$=input circuit series inductance
$C$=input circuit series capacitance
L is related to $Q_o$ and $R_p$ by $$L=Q_oR_p/\omega \quad (3)$$

where $\omega=2\pi f$.

The input impedance at any frequency with the output terminated is given by $$Z=R_p+j(X_1-X_c)+\frac{X^2_m}{(R_s+R_{rt})+j(X_s+X_{rt})} \quad (4)$$

where $R_p$=the resistance of the primary circuit (including $C_p$, $C_t$ and $L_p$)
$X_1$=the reactance of $L_p$
$X_c$=the reactance of $C_p$ and $C_t$
$X_m$=mutual reactance between $L_p$ and $L_s$
$R_s$=the resistance of $L_s$
$R_{rt}$=receiver resistance (load resistance)
$X_s$=the reactance of $L_s$
$X_{rt}$=the reactance of the receiver (load reactance).

Capacitive values of $X_{rt}$ can cause undesirable shunting at certain frequencies other than those immediately above the channel frequency so it is preferred that receivers $R_1$–$R_n$ be of the type displying an inductive input impedance characteristic, for example, receivers with a transformer input.

The specifications for the components in the preferred embodiment of the invention are given directly below. The core for the 2–6 mc. unit is 0.330 inch in diameter, 4 inches long and made of ferrite; whereas the cores used in the 5–15 and 11–32 mc. units are 0.5 inch in diameter, 3.25 inches long and made of powdered iron. The 2–6 mc. coil $L_p$ consists of 66 turns of No. 20 wire wound at a pitch of 20 turns per inch on a 0.8125 inch diameter polystyrene coil form; the 5–15 mc. coil consists of 45¼ turns of No. 20 wire wound at pitch of 16 turns per inch on a 0.766 inch diameter polystyrene coil form; and the 11–32 mc. coil consists of 26 turns of No. 14 wire wound at a pitch of nine turns per inch on a 0.6875 inch diameter polystyrene coil form. All coupling coils $L_s$ are wound with No. 20 wire about coils $L_p$ and the coils are given sufficient turns to match the impedance of the next stage, namely the receiver input. The trimmer capacitor for each unit is 1.5–7 micro-microfarad. The adjustable capacitor $C_p$ is 14.3–43.0 micro-microfarads for the 2–6 mc. unit, 8.4–28.2 micro-microfarads for the 5–15 mc. unit, and 6.7–17.6 micro-microfarads for the 11–32 mc. unit.

Figures 3, 4:
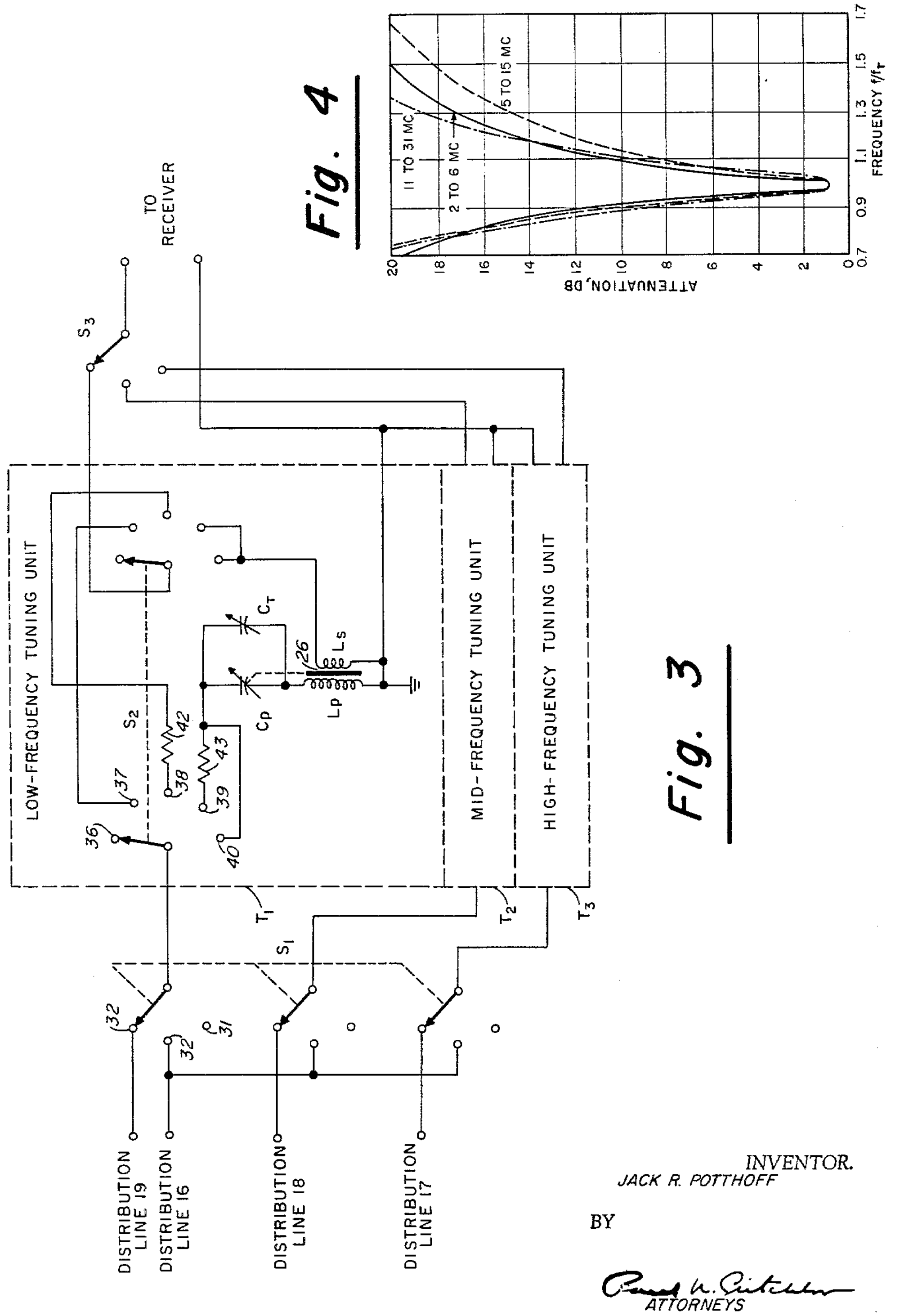
FIG. 3 is a complete schematic diagram of a coupler.
FIG. 4 is a graph that depicts the selectivity of the tuning units.

FIG. 3 illustrates the circuit for a complete coupler such as $C_1$. The coupler has three tuning units $T_1$–$T_3$ and each tuning unit embodies a series-tuned circuit like that shown in FIG. 2. Tuning units $T_2$ and $T_3$ are depicted by means of broken-line boxes to avoid redundancy of components since they have the same circuit configuration as tuning unit $T_1$. The values for $C_p$, $C_t$, $L_p$, $L_s$ and 26 vary from $T_1$–$T_3$ so that $T_1$ covers a low-frequency band, $T_2$ covers a mid-frequency band and $T_3$ covers a high-frequency band. In the preferred embodiment the frequency ranges for $T_1$–$T_3$ are 2–6 mc., 5–15 mc. and 11–32 mc. respectively.

Switch $S_1$ is a triple-pole, triple-throw switch which functions as a signal-selector switch. Proceeding in a clockwise direction from switch position 31 through position 33, the switch functions to: (1) disconnect the tuning units from all distribution lines; (2) connect the tuning units to distribution line 16; (3) connect the tuning units to their associated distribution lines (and to their respective antennas).

Switch $S_2$, shown in FIG. 3, is a double-pole, quintuple-throw switch which serves primarily to prevent loading of the distribution lines not in use by their associated tuning units. The switch also increases the operational flexibility of the system. Proceeding in a clockwise direction and from switch position 36 to position 40 the switch functions to: (1) disconnect the tuning units from their associated distribution lines (2) bypass the tuning units to eliminate the tuning unit loss in the event that only one receiver is operated on a distribution line and the added selectivity of the tuning unit is not required to suppress receiver overload in the presence of strong local transmissions; (3) bypass the tuning units to enable connection of a distribution line to the receiver by means of a series-connected resistor (if the series-tuned circuit becomes defective); (4) connect the tuning units to their respective distribution lines via a series-connected resistor 43 to increase the impedance across the distribution lines when operating two adjacent receivers with little frequency spacing; and (5) enable the series-tuned circuits (provide normal operation).

Switch $S_3$ is a single-pole, triple-throw switch which serves as a tuning-unit selector switch. The switch functions to connect either $T_1$, $T_2$ or $T_3$ to a wide range communication receiver such as $R_1$.

The couplers $C_1$–$C_n$ and their respective receivers $R_1$–$R_n$ are preferably arranged in order of decreasing operating frequency toward the terminating resistors. For a given number of channels and frequency spacing, such an arrangement reduces the variation of the terminating impedance (as seen by any coupler) from the nominal value. Couplers toward the antenna from a given coupler tend to transform the impedance of the coupler shunted by its termination such as to provide an improved match to the antenna. Such an arrangement also provides a more advantageous insertion loss, one that is approximately one-half that produced when the operating frequencies are arranged conversely.

The length of the distribution lines 17–19 between the first coupler ($C_1$) and the last coupler ($C_n$) is preferably limited to one-half wavelength at the highest frequency of line operation so as to reduce any variation in terminating impedance seen by one coupler as other couplers are added to the line between the coupler and the terminating resistor for that line.

A plot of the selectivity of the tuning units $T_1$–$T_3$ is shown in FIG. 4. Attenuation in decibels is plotted along the ordinate of the graph and the ratio of off-resonant frequency to resonant frequency is plotted along the abscissa. The selectivity of the couplers in conjunction with their terminating resistors reduces greatly the probability of receiver input circuit burnout due to strong local transmissions. This is extremely advantageous as a voltage as high as 50 volts can be induced on a receiving antenna in close proximity to a high-power transmitting antenna. In addition, the selectivity reduces the tendency of receiver local oscillator radiation to back into the distribution lines.

The number of receivers ($R_n$) that can be used in the system is a function of the impedance match between the coupler and the receiver, the better the match the greater number of receivers that can be accommodated. Using a coupler output impedance of 70 ohms, the system will, for example, accommodate 37 Navy Model RBB/RBC communication receivers (receivers having a 70-ohm nominal value input impedance).

The average insertion loss to any receiver in the system, compared to the same receiver operating singly from an antenna providing the same voltage-standing-wave ratio and available power, is about 4½ db for any antenna VSWR up to 5:1.

Obviously many modifications and variations of the present invention are possible in the light of the above teachings. It is therefore to be understood, that within the scope of the appended claims, the invention may be practiced otherwise than as specifically described.

I claim:

1. In a multi-receiver distribution system employing a plurality of broadband antennas each connected to a distribtuion line that is terminated in its characteristic impedance, a plurality of broadband couplers, said couplers each comprising three selective tuneable circuits, said three tuneable circuits being adapted to cover a low-frequency band, a mid-frequency band and a high-frequency band, respectively, each tuneable circuit having an adjustable capacitance connected in series with an adjustable inductance, said couplers having output circuits adapted for connecting to a receiver, said couplers also having input circuits, means for connecting each coupler input circuit to any one of said antennas.

2. A system in accordance with claim 1 wherein means are connected to said couplers for permitting calibration of said tuneable circuits.

3. In combination, a plurality of broadband antennas, a like plurality of terminating impedances, means for coupling each of said antennas to one said terminating impedances, a plurality of couplers, a like plurality of receivers, each of said couplers comprising; a first switching circuit having an input and an output, a plurality of series-tuneable circuits, a second switching circuit having an input and an output, means for connecting said first switching circuit output to said series tuneable circuits, means for connecting said second switching circuit input to said series-tuneable circuits, each series-tuneable circuit comprising an adjustable capacitance and a ferrite-core-tuned inductance, said capacitance and said inductance being connected in series; means for coupling said first switching input circuits to said antennas, and means for coupling said second switching output circuits to said receivers, respectively.

4. In a distribution system of the type employing a plurality of broadband antennas each connected to a terminating resistor, a plurality of couplers, said couplers each comprising three tuneable circuits, said three tuneable circuits adapted to cover a low-frequency spectrum, a mid-frequency spectrum and a high-frequency spectrum, respectively, said couplers having outputs adapted for coupling to a receiver, and inputs, means for connecting said coupler inputs to any one of said antennas.

5. In a broadband distribution system, a plurality of antennas, a like plurality of terminating resistors, each of said antennas being tuned to a different frequency band, means for electrically connecting each of said antennas to one of said terminating resistors, a plurality of coupler units, a like plurality of multi-band receivers, each of said coupler units comprising an input switching circuit, a plurality of series-tuned circuits and an output switching circuit, said switching circuits in each coupler being adapted to couple one of said series-tuned circuits to one of said antennas and one of said receivers.

References Cited by the Examiner

UNITED STATES PATENTS

| | | | |
|---|---|---|---|
| 1,995,731 | 3/35 | Amy et al. | 325—308 |
| 2,127,336 | 8/38 | Leng | 343—853 X |
| 2,628,312 | 2/53 | Peterson et al. | 343—858 |
| 2,895,129 | 7/59 | Kamen et al. | 343—850 X |

HERMAN KARL SAALBACH, *Primary Examiner.*